US012655898B2

(12) United States Patent
Khale et al.

(10) Patent No.: US 12,655,898 B2
(45) Date of Patent: Jun. 16, 2026

(54) INTERNAL BREATHER CAP TO PREVENT OIL EXPULSION

(71) Applicant: BorgWarner Inc., Auburn Hills, MI (US)

(72) Inventors: Pritish Khale, Rochester Hills, MI (US); Chandreshwar Rao, Lake Orion, MI (US); Jagdish S. Daphal, Troy, MI (US); Maureece Musgraves, Auburn Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/824,965

(22) Filed: Sep. 5, 2024

(65) Prior Publication Data

US 2026/0063195 A1     Mar. 5, 2026

(51) Int. Cl.
    F16H 57/027          (2012.01)
(52) U.S. Cl.
    CPC ................................. F16H 57/027 (2013.01)
(58) Field of Classification Search
    CPC .................................................... F16H 57/027
    See application file for complete search history.

(56) References Cited

U.S. PATENT DOCUMENTS

| | | | |
|---|---|---|---|
| 3,866,789 A | * | 2/1975 | Lambert ............... F16H 57/027 |
| | | | 220/373 |
| 4,794,942 A | | 1/1989 | Yasuda et al. |

| | | | |
|---|---|---|---|
| 4,970,913 A | | 11/1990 | Kielar et al. |
| 5,660,587 A | | 8/1997 | Baer |
| 7,147,110 B2 | | 12/2006 | Clausen et al. |
| 7,601,191 B2 | | 10/2009 | Droste et al. |
| 9,309,959 B2 | * | 4/2016 | Ishikawa ............... F16H 57/027 |
| 9,625,029 B2 | * | 4/2017 | Vituri ................... F16H 57/029 |

(Continued)

FOREIGN PATENT DOCUMENTS

| | | | |
|---|---|---|---|
| CN | 214661905 U | * | 11/2021 |
| CS | 231142 B1 | | 10/1984 |

(Continued)

OTHER PUBLICATIONS

Translation of DE 102013021747 A, obtained in Fit Database (Year: 2015).*

(Continued)

*Primary Examiner* — Thomas C Diaz
(74) *Attorney, Agent, or Firm* — Reising Ethington P.C.

(57)          ABSTRACT

A breather assembly for a transfer case includes a tube and a cap. The tube has a proximal end, a distal end, a passage extending therethrough between the proximal and distal ends, and distal-end barbs for coupling the tube to a hose. The cap includes an annular body having a cavity with an opening at a first end configured to receive the proximal end of the tube. The cap includes a cover member that closes a second end of the body opposite the first end. The body has holes therethrough leading to the cavity. The holes, the cavity, and the passage form a passageway for venting air from an interior of the transfer case. The cover member extends radially outwardly of the holes to provide a barrier to keep lubricating oil, which splashes by a rotating or moving element, from reaching and entering the holes and being expelled.

19 Claims, 5 Drawing Sheets

(56)     References Cited

U.S. PATENT DOCUMENTS

| 11,940,056 | B2 * | 3/2024 | Grupido ................. F16K 17/02 |
| 2005/0166557 | A1 | 8/2005 | Ramajois et al. |
| 2006/0096411 | A1 | 5/2006 | Aldrich et al. |
| 2012/0312120 | A1 | 12/2012 | Engelmann et al. |
| 2017/0299046 | A1 | 10/2017 | Reth et al. |
| 2019/0309840 | A1 | 10/2019 | Alexiou et al. |
| 2021/0254734 | A1 | 8/2021 | Christoff, III |

FOREIGN PATENT DOCUMENTS

| DE | 102013021747 | A1 * | 6/2015 | ............. F16K 24/04 |
| JP | 07029374 | U | 6/1995 | |
| JP | 2007263240 | A * | 10/2007 | ........... F16H 57/027 |
| JP | 2017125536 | A | 7/2017 | |

OTHER PUBLICATIONS

Translation of CN 214661905 U, obtained in fit database (Year: 2021).*

Written Opinion & International Search Report for PCT/US2025/044459 dated Jan. 12, 2026, (10 pages).

* cited by examiner

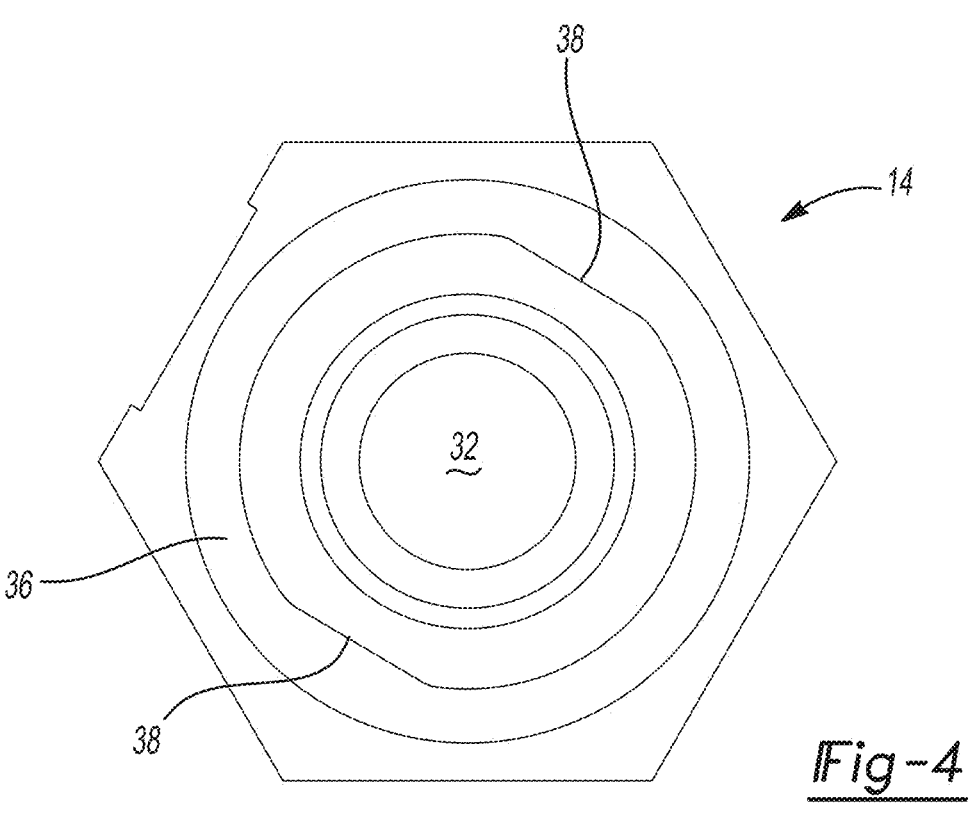
_Fig-4_
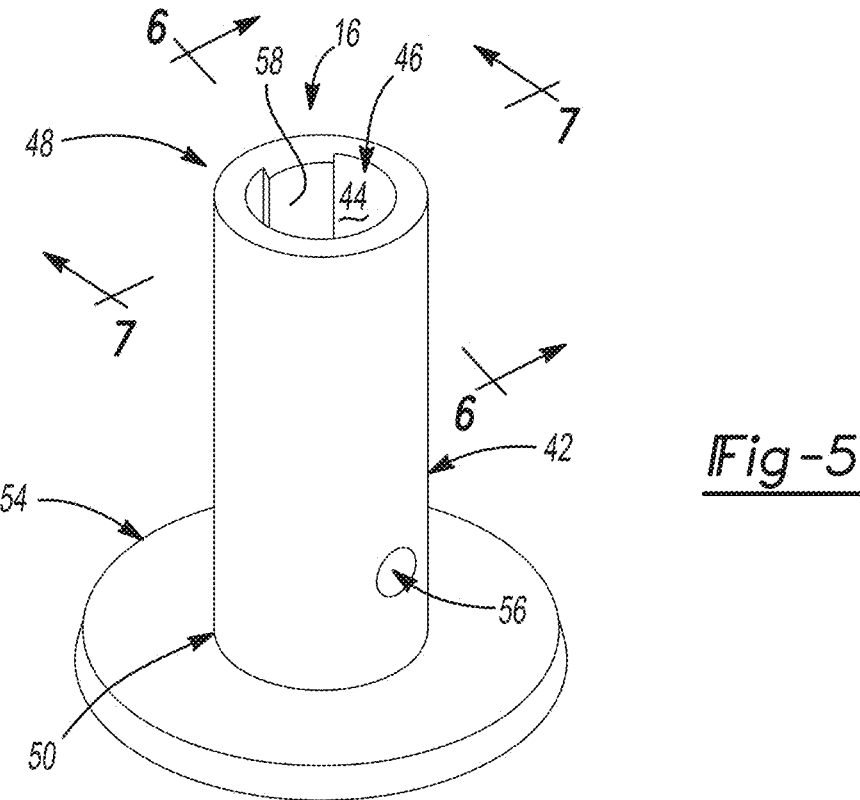
_Fig-5_

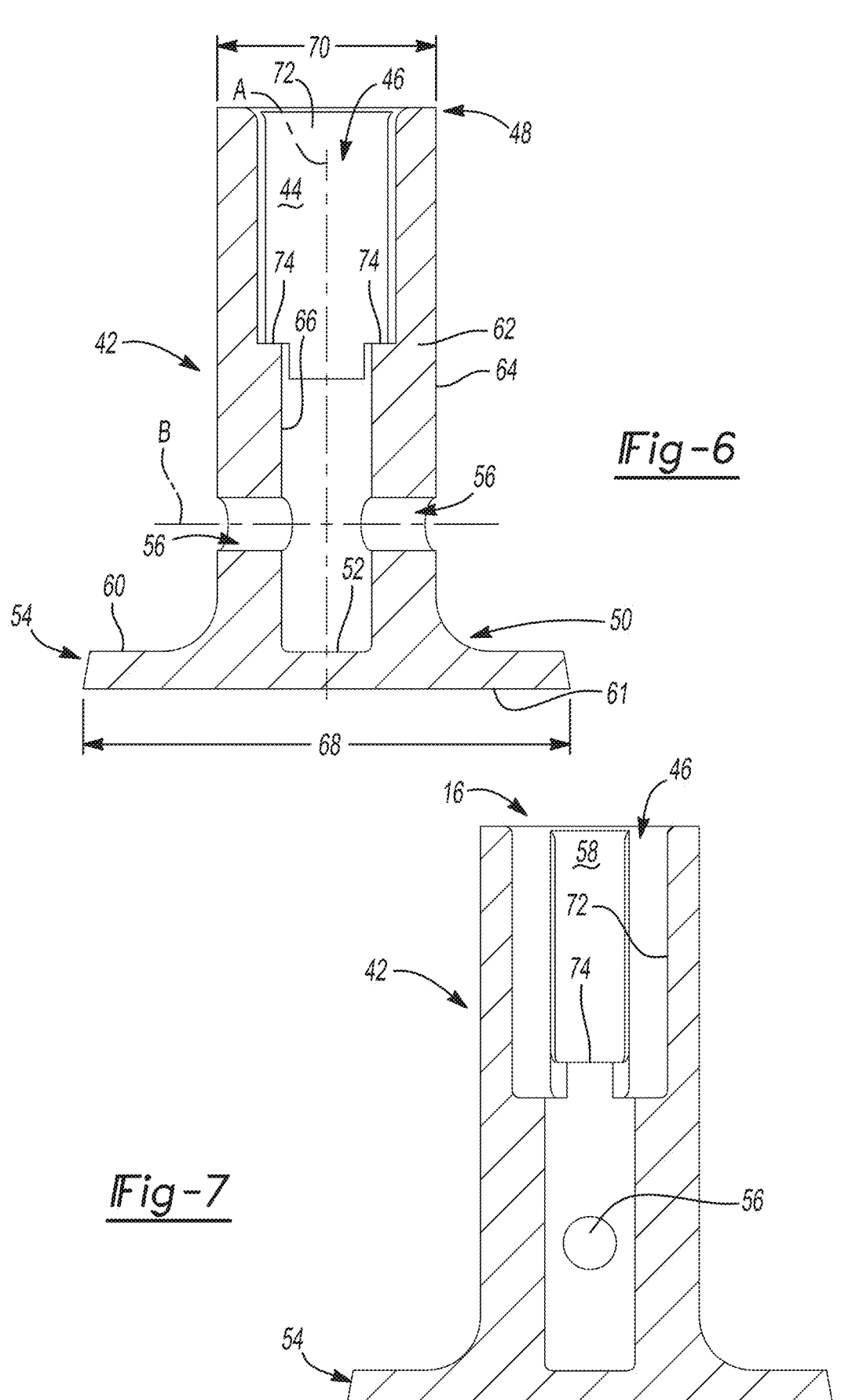
_Fig-6_
_Fig-7_

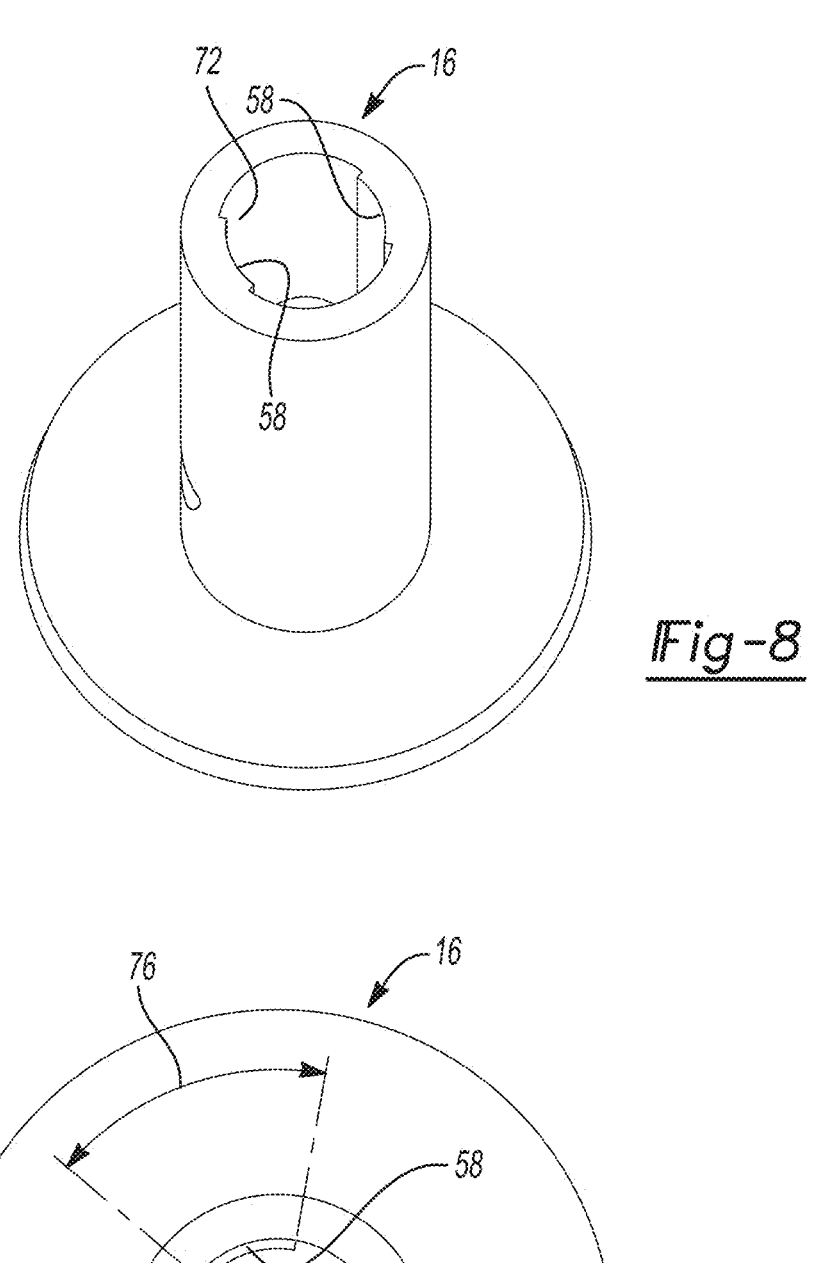
_Fig-8_
_Fig-9_

INTERNAL BREATHER CAP TO PREVENT OIL EXPULSION

TECHNICAL FIELD

The present application relates generally to a cap for a breather assembly for a driveline component and more particularly to an internal breather cap for a breather assembly.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

An air venting or breather arrangement in general may be mounted in a driveline component, such as a power transfer case, to provide an air venting passageway that allows pressurized air to flow out from an interior of the driveline component to an exterior. In some instances, lubricating oil from may also be expelled through the passageway. For those driveline components where relocation of the venting arrangement away from the splashing lubricating oil is not possible, it would be useful to provide an air venting configuration that minimizes or prevents lubricating oil from being expelled.

SUMMARY

In one implementation, a breather assembly for a driveline component includes a tube and a cap. The tube has a proximal end, a distal end, and a passage extending therethrough between the proximal end and the distal end, wherein the distal end is configured for coupling to a hose. The cap includes an annular body having a cavity with an opening at a first end where the proximal end of the tube extends through the opening and is received in the cavity of the annular body. The cap further includes a cover member that is fixedly coupled to and closes a second end of the annular body opposite the first end. The annular body also has a hole therethrough, where the hole is located between the first end of the annular body and the cover member. The hole is in communication with the cavity and the cavity is in communication with the passage through the tube to form a passageway that allows air to vent from an interior of the driveline component to an exterior thereof. The annular body has an axis wherein the cover member extends radially outwardly of the hole to provide a barrier to keep lubricating oil splashing within the interior from reaching and entering the hole.

In another implementation, a breather assembly is provided for a transfer case that has a housing where the housing defines an exterior and an interior. The transfer case includes an element in the interior that moves during operation. The breather assembly includes a tube and a cap. The tube has a proximal end, a distal end, and an air passage extending therethrough between the proximal end and the distal end. The distal end includes a plurality of barbs configured to facilitate coupling the tube to a hose.

The cap includes an annular body having an axis and a cavity with an opening at a first end. The proximal end of the tube extends through the opening and is received in the cavity. The cap further includes a cover member that is fixedly coupled to and closes a second end of the annular body opposite the first end. The annular body further has a pair of holes each extending between an outer surface of the annular body and the cavity. The holes are axially located between the first end of the annular body and the cover member. A portion of the tube intermediate the distal end and the proximal end is configured to be mounted to an inside wall of the housing. The holes, the cavity, and the passage together form a passageway that allows for the exchange of air between the interior and the exterior. The cover member extends radially outwardly away from the holes to provide a barrier to keep lubricating oil being splashed by the moving element from reaching and entering the holes.

BRIEF DESCRIPTION OF THE DRAWINGS

FIG. 4 is a side view of the implementation of the tube of FIG. 3;

FIG. 5 is a side view of the implementation of the cap of FIG. 2;

FIG. 6 is a cross-sectional view of the implementation of the cap of FIG. 5 taken substantially along line 6-6;

FIG. 7 is a cross-sectional view of the implementation of the cap of FIG. 5 taken substantially along line 7-7;

FIG. 8 is a further view of the implementation of the cap of FIG. 5; and

FIG. 9 is a top view of the implementation of the cap of FIG. 8.

DETAILED DESCRIPTION

In an automotive vehicle, a driveline component is used to transfer power originating from a prime mover (e.g., an engine or other source of power) to drive wheels. For example, a four-wheel drive (4WD) transfer case can transfer power to front and rear axles of the vehicle. Lubricating oil is typically used in the driveline component to lubricate rotating and/or moving elements. The transfer case may include an air venting arrangement that provides an air passageway so that during operation, pressurized air in an interior of the transfer case can be vented to an exterior of the case. As the rotating and/or moving elements spin/move through the lubricating oil, the oil is splashed around within the interior.

In a transfer case configuration, a breather barb vent is provided to perform the venting function described above, which may be relatively long, as an oil expulsion prevention measure. However, when the transfer case is operated for aggressive pitch and roll angles, it can exhibit oil expulsion, for example, in 4WD mode at high speeds. This is due to the breather barb vent being located in proximity to a moving chain located inside the transfer case. Spinning of the chain creates oil splash, which, when spread around in the proximity of the breather barb vent, can cause oil to percolate due to a capillary action.

In accordance with an aspect of the disclosure, a breather assembly is provided that includes a tube and a cap. The cap is configured to provide a barrier to lubricating oil to minimize and/or prevent oil expulsion through the air venting arrangement. In implementations, the cap functions both as a device to seal oil to the interior of the driveline component as well as to allow the driveline component to breath/vent as desired.

Further implementations of the cap are provided with features that accommodate ergonomic assembly processes. In an implementation, a press fit assembly capability is provided by structures and dimensional and/or material selection to be described hereinafter, including a mechanical stop feature, which indicates to an operator that the cap cannot be further pressed onto the tube end. This results in a press fit assembly that can be achieved without the use of any additional equipment, which is what makes the assembly ergonomic.

Figure 1:
FIG. 1 is an isometric view of a transfer case with portions broken away to show an implementation of a breather assembly having a tube and a cap.

FIG. 1 is an isometric view of a breather assembly 10 for a driveline component such as a transfer case 12. A part of the assembly 10 is located generally inside or in the interior of the transfer case 12 and includes a tube 14 and a cap 16.

Figures 2, 3:
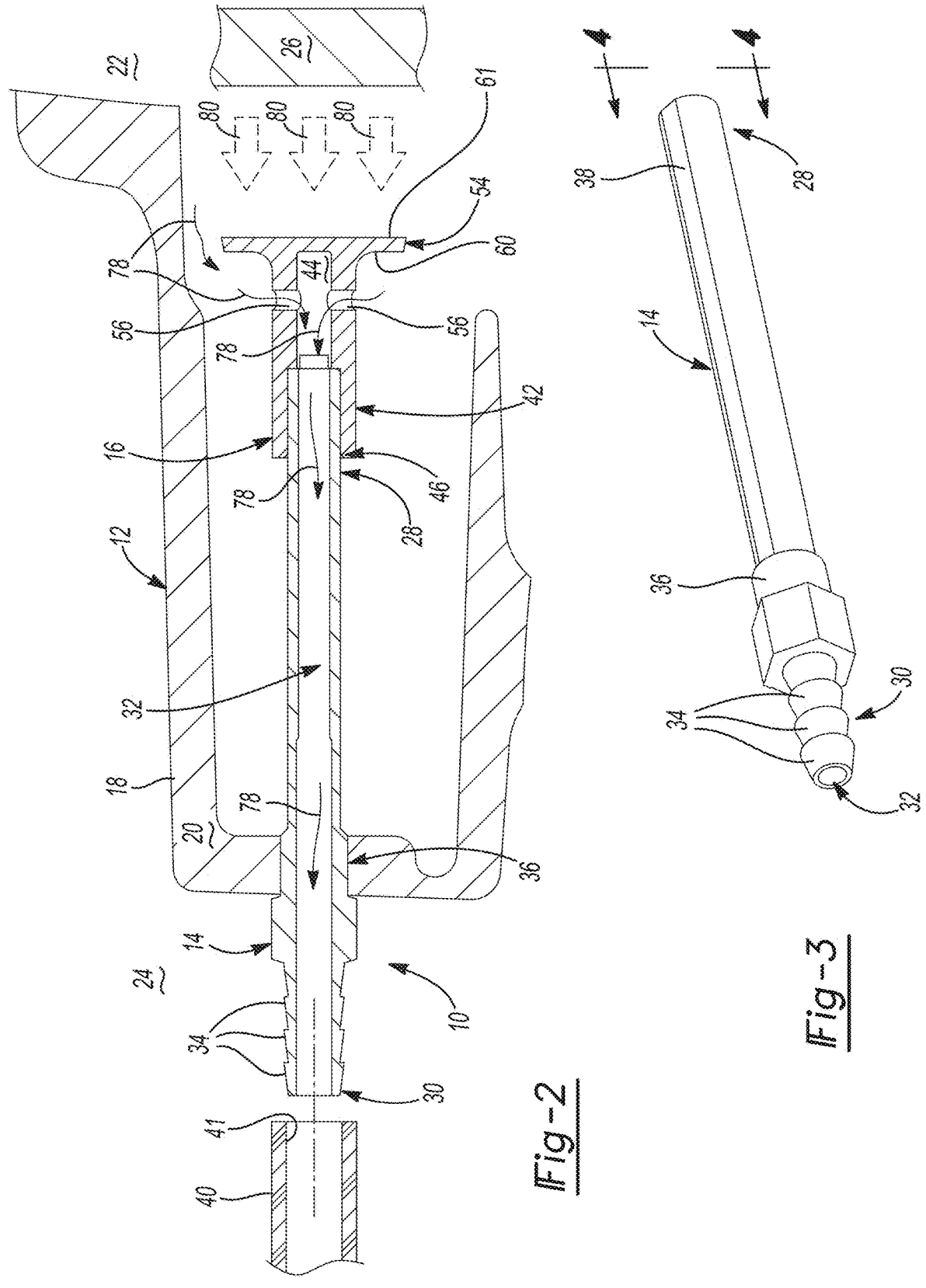
FIG. 2 is a cross-sectional view of the implementation of the breather assembly of FIG. 1 taken substantially along line 2-2.
FIG. 3 is an isometric view of the implementation of the tube of FIG. 2.

FIG. 2 is a cross-sectional view of the implementation of the breather assembly of FIG. 1 taken substantially along line 2-2. The transfer case 12 is shown partially diagrammatically as including a housing 18 with an inside wall 20, an interior 22 of the transfer case that is defined by the housing 18, as well as an exterior 24 of the transfer case, which may be an ambient environment. The transfer case 12 includes at least one element 26 that rotates and/or moves in some manner during operation, which element 26 may be a chain, for example. The rotation and/or movement of the element 26 may occur in lubricating oil, either completely or at least partially, which creates oil splash within the interior 22. During operation of the transfer case 12, the air within the interior 22 may become pressurized. The assembly 10 is configured to provide an air passageway such that air is permitted to flow from the interior 22 to the exterior 24 while minimizing and/or preventing the expulsion of lubricating oil through the same air passageway.

FIG. 3 is an isometric view of the tube 14. The tube 14 functions as a breather vent. The tube 14 is generally elongated and has a proximal end 28, an opposing distal end 30, and central air passage 32 extending therethrough between the proximal and distal ends 28, 30. The tube 14 also includes a plurality of barbs 34 on an outside part of the distal end 30 to facilitate coupling the tube 14 to a hose. A portion 36 on the outside of the tube 14, which is located at an intermediate location between the proximal and distal ends 28, 30, is configured to be fixedly mounted to the inside wall 20 of the housing 18. When mounted, the tube 14 has its proximal end 28 in the interior 22 of the transfer case 12. In an implementation, the portion 36 can be threaded wherein the tube 14 can be threaded fit to the housing 18 (e.g., inside wall 20) by using the hex head that is located between the barbs 34 and the portion 36 to rotate the tube 14. In another implementation, the tube 14 can be press fit to the housing 18 by pressing on the distal end 30 such that the portion 36 is seated in the opening proximate the inside wall 20 of the housing 18. The tube 14 further includes a pair of features 38 (one shown in FIG. 3) comprising a pair of flats 38 on an otherwise generally annular or circular exterior surface of the tube 14. Each one of the pair of flats 38 extend from the extreme free end of the tube 14 (proximal end 28) to the mounting portion 36. In implementations, the tube may comprise aluminum, steel, or zinc material.

The flats 38, in an implementation, exist due to the manufacturing process of the tube 14. The flats 38 extend radially-outwardly by an amount less than the outside diameter (OD) of the round part of the tube 14, and thus the flats 38 are diametrically smaller in size the round part (i.e., OD) of the tube 14. The flats 38 therefore allow further venting to occur through the cap 16.

FIG. 4 is a side view of tube 14 as viewed in the direction of line 4-4 in FIG. 3. As shown, the flats 38 diametrically oppose each other.

With continued reference to FIG. 2, the barbs 34 are configured to facilitate coupling of the tube 14 to a hose 40. The hose 40 includes a central lumen 41, such that when the hose 40 is coupled to the tube 14, the passage 32 will be in air communication with the lumen 41. A terminal end of the hose 40 (i.e., the end opposite of the end that is coupled to the tube 14) may be routed to and secured at a suitable location outside of the transfer case housing 18. As installed, the cap 16 resides in the interior 22 (i.e., an internal breather cap) and functions to provide a barrier to keep lubricating oil from reaching and entering the air venting passageway, without inhibiting or impairing the air venting function.

FIG. 5 is a view of an implementation of the cap 16 of FIG. 2. The cap 16 includes a generally annular body 42 having a central cavity 44, which may be generally cylindrical in shape. The cavity 44 has an upper opening 46. The body 42 is elongated and extends between a first end 48 and a second end 50. The opening 46 and the cavity 44 are configured in size and shape to receive the proximal end 28 of the tube 14 (best shown in FIG. 2). In other words, the proximal end 28 extends through the opening 46 and is received in the cavity 44.

The cap 16 further includes a cover member 54 that is fixedly coupled to and functionally closes the second end 50 of the body 42, in particular, closes the cavity 44 by way of the floor 52 (FIG. 6). The cap 16 still further includes a pair of holes 56 through the body 42 where each hole 56 extends from an outer surface of the body 42 to the cavity 44. The holes 56 are axially located between the first end 48 and the member 54. The cap 16 further includes a pair of first features 58 in the cavity 44. In an implementation, the body 42 and the member 54 are together of unitary construction (i.e., the cap 16 is unitary), rather than being two pieces. In implementations, the cap 16 may comprise plastic with reinforcements that can handle high temperatures, for example only, PA022 GF35 per ASTM D 6779 (i.e., 35% glass fiber reinforced polyamide 6, heat stabilized).

FIG. 6 is a cross-sectional view of the cap 16 of FIG. 5 taken substantially along line 6-6. The cavity 44 has a generally cylindrical shape. The member 54 may be generally disc-shaped and extends radially outwardly of the holes 56, particularly, the openings of the holes 56. The member 54 includes a first surface 60 that faces in a first direction towards the holes 56 and a second surface 61 facing in second direction opposite the first direction. The body 42 includes an axis "A" and has a sidewall 62 defined between an outer surface 64 and a first inner surface 66. The portion of the cavity 44 that is proximate the floor 52 and the holes 56 has a reduced inside diameter. The holes 56 comprise cross-holes being formed along an axis "B", which is generally perpendicular to axis "A". The holes 56 extend through sidewall 62 from the outer surface 64 to the first inner surface 66. The holes 56 are spaced away from member 54.

The member 54 extends radially outwardly away from body 42 and functions as a mechanical barrier to keep lubricating oil from reaching and entering holes 56. The member 54 is sized to have a first outside diameter designated 68 while the body 42 is sized to have a second outside diameter designated 70, wherein the first outside diameter 68 is greater than the second outside diameter 70. The portion of the cavity 44 that is proximate the opening 46 is bounded by a second inner surface 72, which defines an enlarged inside diameter of the cavity 44 relative to that portion that is proximate the holes 56.

FIG. 7 is a cross-sectional view of the cap 16 of FIG. 5 taken substantially along line 7-7. The cavity 44 has the first feature 58 axially extending from opening 46 to a seat 74. The seat 74 can function as a mechanical stop when the tube 14 is inserted into cap 16. In other words, the tube 14 is inserted through opening 46 into cavity 44 until the free end of the tube 14 engages the seat 74, which is shown in FIG. 2.

FIG. 8 is a view of the cap 16 showing the cavity 44 including a pair of opposing first features 58. First features 58 extend radially-inwardly from the second inner surface 72.

FIG. 9 is a top view of the cap 16. As shown, the first features 58 also circumferentially extend by an amount 76. The tube 14 includes a pair of second features, namely the aforementioned flats 38. In an implementation, the circumferential extent 76 may be greater than the circumferential extent of the flats 38, thereby assuring that at least some part of the round, outside diameter (OD) of the tube engages the first features 58. In an implementation, the flats 38 do not have to align with the internal features 58, thereby easing assembly. In other words, no matter the relative rotational orientation of the tube 14 and the cap 16 relative to each other, there will be some engagement of the round OD of the tube 14 and the internal features 58 allowing for a press fit coupling of the cap 16 and the tube 14, as described herein. The provision of the flats 38, however, keeps the press fit force (effort) to a lower value for easy hand assembly by an operator, without the use of additional equipment (i.e., ergonomic assembly process). As also mentioned, the flats 38 allow for further venting.

Also, the aforementioned press fit method of assembly ensures that the cap 16 stays on the tube 14 even when temperatures become elevated during operation (e.g., 135 degrees Celsius). In a lowest press fit condition (i.e., lowest force required for inserting the cap 16 onto the tube 14) where the flats 38 line up with/overlap with the internal features 58, the integrity of the press fit assembly exceeds that sufficient to maintain the coupling of the cap 16 to the tube 14, even under a maximum expected temperature condition (i.e., thermal expansion condition).

Returning to FIG. 2, in the illustrated embodiment, air is identified by solid-line arrows 78. Air in the interior 22 of the transfer case 12 can flow through the holes 56 to the cavity 44, for example, when the interior 22 is pressurized during operation of the driveline component. The cavity 44 is in turn in air communication with the passage 32, which in turn is in air communication with the hose lumen 41. Thus, the holes 56, the cavity 44, the passage 32 (and the lumen 41 when the hose 40 is attached) form an air passageway to allow air to vent from the interior 22 to the exterior 24. The size of the holes 56 may span a relatively large range. One consideration involves how complicated of a manufacturing process one would want to use. For example, a relatively tiny hole (orifice) 56 could be used but that may involve a secondary process, and may possibly adversely affect performance, since the smaller size hole could cause a capillary action to occur (i.e., allowing for oil migration) and potentially defeat the purpose of having a cap. On the other hand, a large size hole 56 may make the cap 16 structurally weaker.

In addition, the member 54, particularly surface 61, acts as a barrier that minimizes and/or prevents lubricating oil, which is shown by dashed-line arrows 80, from reaching and entering the holes 56. This prevents oil from being expelled through the air passageway described above.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A breather assembly for a driveline component, comprising:

a tube having a proximal end and a distal end, the tube having a passage extending therethrough between the proximal end and the distal end, wherein the distal end is configured for coupling to a hose, a pair of diametrically opposed flats on an otherwise annular exterior surface of the tube, the flats extending from an extreme free end of the tube at the proximal end, the flats being diametrically smaller in size than a tube outside diameter; and a cap including an annular body having a cavity with an opening at a first end, the proximal end of the tube extending through the opening and being received in the cavity, the cap further including a cover member that is fixedly coupled to and closes a second end of the annular body opposite the first end, the annular body having a hole therethrough located between the first end and the cover member, wherein the hole is in communication with the cavity and the cavity is in communication with the passage of the tube to thereby form a passageway to allow air to vent from an interior of the driveline component to an exterior thereof, the annular body having an axis wherein the cover member extends radially outwardly of the hole to provide a barrier to keep lubricating oil within the interior from reaching and entering the hole;

wherein the annular body has an inner surface defining the cavity, the annular body further including a pair of opposing first features that are each circumferentially extending and are each radially inwardly extending from the inner surface, and wherein a circumferential extent of the first features is greater than a circumferential extent of the flats.

2. The breather assembly of claim 1 wherein the cover member extends radially outwardly of the annular body.

3. The breather assembly of claim 1 wherein the annular body has a sidewall and the hole extends through the sidewall from an outer surface of the annular body to the cavity.

4. The breather assembly of claim 3 wherein the hole is a first hole, the annular body having a second hole extending through the sidewall from the outer surface to the cavity.

5. The breather assembly of claim 4 wherein the first hole and the second hole are perpendicular to the axis of the annular body.

6. The breather assembly of claim 4 wherein the first hole and the second hole are aligned and are perpendicular to the axis of the annular body.

7. The breather assembly of claim 1 wherein the cover member has first outside diameter and the annular body has a second outside diameter, and wherein the first outside diameter is greater than the second outside diameter.

8. The breather assembly of claim 7 wherein the cover member has a first surface facing in a first direction towards the hole and a second, opposing surface facing in a second direction opposite the first direction.

9. The breather assembly of claim 1 wherein the driveline component comprises a transfer case having a housing, wherein a portion of the tube intermediate the distal end and the proximal end is configured to be mounted to the housing.

10. The breather assembly of claim 1 wherein the distal end of the tube includes a plurality of barbs configured for coupling the tube to a hose.

11. The breather assembly of claim 1 wherein the cap is of unitary construction.

12. The breather assembly of claim 1 wherein at least some part of the annular outside diameter of the tube engages the first features.

13. A breather assembly for a transfer case that has a housing defining an interior and an exterior, the breather assembly comprising:

a tube having a proximal end and a distal end, the tube having an air passage extending therethrough between the proximal end and the distal end, the distal end including a plurality of barbs configured for coupling the tube to a hose, a pair of diametrically opposed flats on an otherwise annular exterior surface of the tube, the flats extending from an extreme free end of the tube at the proximal end, the flats being diametrically smaller in size than a tube outside diameter;

a cap including an annular body having an axis and a cavity with an opening at a first end, the proximal end extending through the opening and being received in the cavity, the cap further including a cover member that is fixedly coupled to and closes a second end of the annular body opposite of the first end, the annular body further having a pair of holes each extending between an outer surface of the annular body and the cavity, the holes being axially located between the first end of the annular body and the cover member; and wherein a portion of the tube that is intermediate the distal end and the proximal end is configured to be mounted to the housing, and wherein the holes, the cavity, and the passage together form a passageway that allows for the exchange of air between the interior and the exterior, and wherein the cover member extends radially outwardly from the holes to provide a barrier to keep lubricating oil from reaching and entering the holes, wherein the annular body has an inner surface defining the cavity, the annular body further including a pair of opposing first features that are each circumferentially extending and are each radially inwardly extending from the inner surface, and wherein a circumferential extent of the first features is greater than a circumferential extent of the flats.

14. The breather assembly of claim 13 wherein the cover member extends radially outwardly away from the outer surface of the annular body.

15. The breather assembly of claim 13 wherein the annular body has a sidewall and the pair of holes extend through the sidewall from the outer surface to the cavity, the holes being perpendicular to the axis.

16. The breather assembly of claim 13 wherein the cover member has a first outside diameter and the annular body has a second outside diameter, wherein the first outside diameter is greater than the second outside diameter.

17. The breather assembly of claim 16 wherein the cover member has a first surface facing in a first direction towards the holes and a second, opposing surface facing in a second direction opposite the first direction.

18. The breather assembly of claim 13 wherein the cap is unitary.

19. The breather assembly of claim 13 wherein at least some part of the annular outside diameter of the tube engages the first features.

* * * * *